United States Patent [19]
Hakvoort et al.

[11] Patent Number: 6,098,019
[45] Date of Patent: Aug. 1, 2000

[54] RESISTIVITY LOG CORRECTION METHOD

[75] Inventors: Richard Gerrit Hakvoort; Johannes Maria Vianney Antonius Koelman, both of GD Rijswijk, Netherlands

[73] Assignee: Shell Oil Company, Houston, Tex.

[21] Appl. No.: 09/168,771

[22] Filed: Oct. 8, 1998

[30] Foreign Application Priority Data

Oct. 8, 1997 [EP] European Pat. Off. .............. 97307947

[51] Int. Cl.$^7$ ....................................................... G01V 1/00
[52] U.S. Cl. ............................................... 702/7; 324/339
[58] Field of Search ................... 702/7; 367/35; 324/339

[56] References Cited

U.S. PATENT DOCUMENTS

| | | | |
|---|---|---|---|
| 4,340,934 | 7/1982 | Segesman | 364/422 |
| 4,517,836 | 5/1985 | Lyle, Jr. et al. | 73/152 |
| 5,064,006 | 11/1991 | Waters et al. | 175/45 |
| 5,210,691 | 5/1993 | Freedman et al. | 364/422 |
| 5,325,714 | 7/1994 | Lende et al. | 73/153 |
| 5,355,088 | 10/1994 | Howard, Jr. | 324/339 |
| 5,446,654 | 8/1995 | Chemali et al. | 364/422 |
| 5,585,727 | 12/1996 | Fanini et al. | 324/399 |

FOREIGN PATENT DOCUMENTS 2318 196   4/1998   United Kingdom ............. G01V 1/28

OTHER PUBLICATIONS

International Search Report dated Dec. 22, 1998.

*Primary Examiner*—Christine Oda
*Assistant Examiner*—Victor J. Taylor

[57] ABSTRACT

A method of determining electric resistivity of an earth formation (1) surrounding a wellbore filled with a wellbore fluid, is provided, which method comprises: operating a resistivity logging tool (2) in the wellbore so as to provide a plurality of resistivity logs ($FLG_1, \ldots, n$) (3) of the earth formation (1) for different radial intervals ($1, \ldots, n$) relative to the wellbore; for each radial interval (k), selecting a modelled resistivity profile ($Rmod_k$) (4); inputting the modelled resistivity profiles ($Rmod_1, \ldots, n$) (4) to a logging tool simulator (6) so as to provide for each radial interval (k) a modelled resistivity log ($MLG_k$) (7) having a depth of investigation corresponding to the radial interval (k); for each radial interval (k) updating the modelled resistivity profile ($Rmod_k$) (7) in dependence of an observed deviation of the resistivity log ($FLG_k$) (3) from the modelled resistivity log ($MLG_k$) (7); and repeating steps c)–d) until for each radial interval (k) the difference between the resistivity log ($FLG_k$) (3) and the corresponding modelled resistivity log ($MLG_k$) (7) is below a selected threshold value (8).

6 Claims, 2 Drawing Sheets

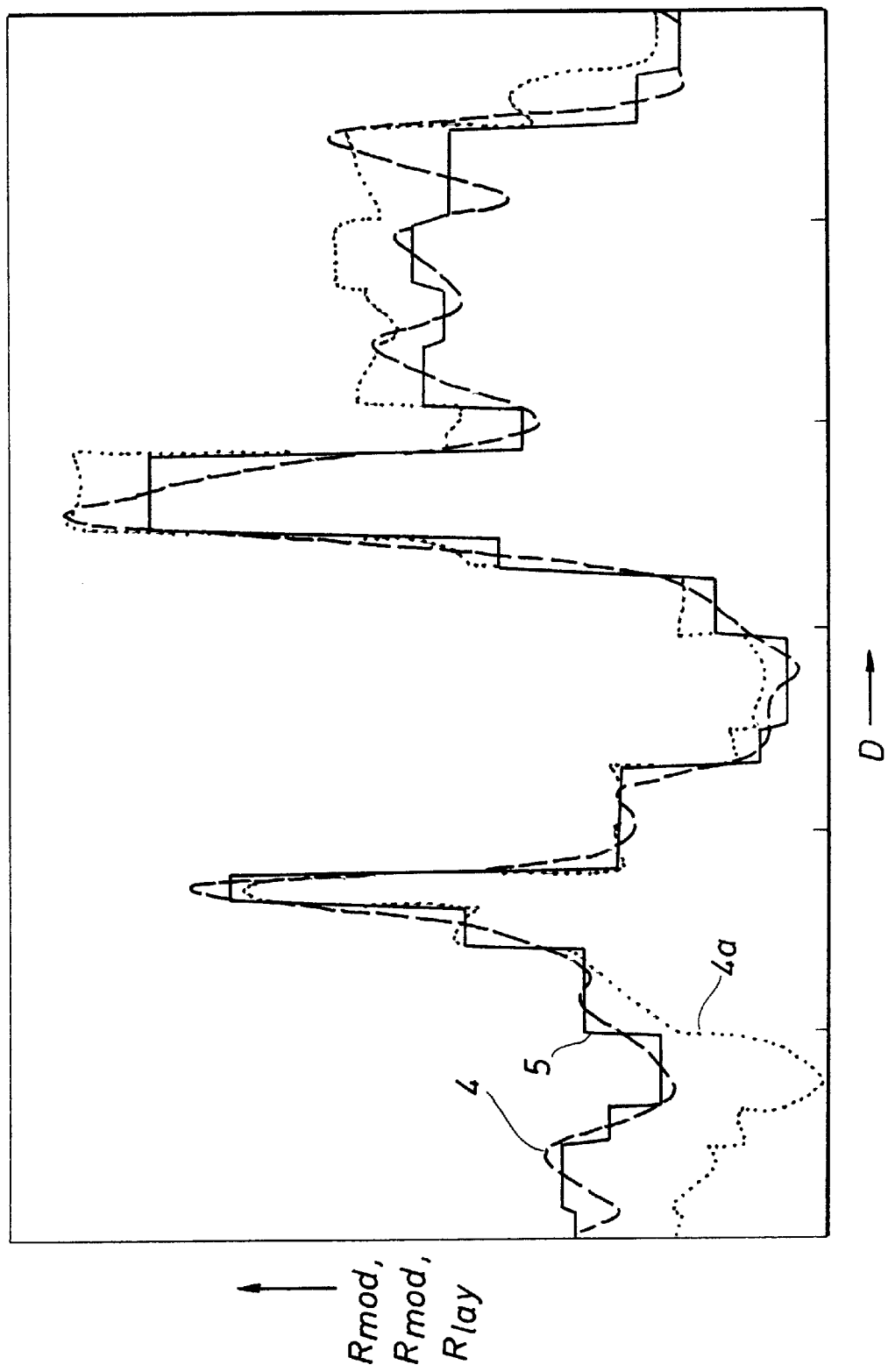

RESISTIVITY LOG CORRECTION METHOD

FIELD OF THE INVENTION

The present invention relates to a method of logging of an earth formation surrounding a wellbore filled with a wellbore fluid.

BACKGROUND TO THE INVENTION

A common method of earth formation logging is resistivity logging in which an electric current is injected or induced in the earth formation and the resulting voltage is determined to provide a resistivity log, which is a measure of the resistivity of the formation as a function of depth. However, a resistivity log seldom reads the true formation resistivities, which are the resistivities of the undisturbed formation in the so-called virgin zone away from the borehole. The resistivity log is influenced by disturbing effects such as the presence of the borehole, invasion of wellbore fluid into the formation (mud-filtrate invasion) and the presence of adjacent earth layers (the so-called shoulder beds). In case one of these effects dominates over the other, so-called correction charts may be used to correct the log for the dominating effect. However, in most cases the disturbing effects are simultaneously present and interweaved in such a way that adding of the individual corrections does not lead to the true formation resistivity.

U.S. Pat. No. 5,446,654 discloses a method of recovering a resistivity profile of an earth formation from a resistivity log by inversion processing via iterated forward modelling. In this method a modelled resistivity profile is initialized and subsequently rectangularized to simulate the different layers of the earth formation. The rectangularized modelled resistivity profile is input to a logging tool simulator to provide a modelled resistivity log. The rectangularized modelled resistivity profile is then corrected (if necessary) in dependence on a discrepancy between the modelled resistivity log and the actual resistivity log.

A drawback of the known method is that no invasion of wellbore fluid into the formation is taken into account and that therefore the obtained resistivity profile does not accurately represent the formation resistivity.

It is an object of the present invention to provide an improved method of determining electric resistivity of an earth formation, whereby account is taken of invasion of wellbore fluid into the formation surrounding the wellbore.

SUMMARY OF THE INVENTION

In accordance with the invention there is provided a method of determining electric resistivity of an earth formation surrounding a wellbore filled with a wellbore fluid, which method comprises:

a) operating a resistivity logging tool in the wellbore so as to provide a plurality of resistivity logs ($FLG_1, FLG_2, \ldots, FLG_n$) of the earth formation for different radial distance intervals ($1 \ldots n$) relative to the wellbore;

b) for each radial distance interval (k, k=1 . . . n), selecting a modelled resistivity profile ($Rmod_k$);

c) inputting the modelled resistivity profiles ($Rmod_1, Rmod_2, \ldots, Rmod_n$) to a logging tool simulator so as to provide for each radial distance interval (k) a modelled resistivity log ($MLG_k$) having a depth of investigation corresponding to the radial distance interval (k);

d) for each radial distance interval (k) updating the modelled resistivity profile ($Rmod_k$) in dependence of an observed deviation of the resistivity log ($FLG_k$) from the modelled resistivity log ($MLG_k$); and e) repeating steps c) and d) until for each radial distance interval (k) the difference between the resistivity log ($FLG_k$) and the corresponding modelled resistivity log ($MLG_k$) is below a selected threshold value, characterized in that step d) comprises updating each modelled resistivity profile ($Rmod_k$) as a function of the ratio $FLG_k/MLG_k$.

By producing resistivity logs for different radial distance intervals from the wellbore and by selecting modelled resistivity profiles for those intervals, it is achieved that a distinction can be made between the resistivity in the invaded zone and the resistivity in the virgin zone, which is outside the invaded zone. The modelled resistivity profiles are initially estimated and then updated in an iterative manner.

BRIEF DESCRIPTION OF THE FIGURES

The invention will now be described in more detail and by way of example with reference to the accompanying drawings, in which:

FIG. 2 shows plots of a modeled resistivity profile, a rectangularized modeled resistivity profile and an updated resistivity profile each as a function of the depth along the wellbore.

DETAILED DESCRIPTION

Figure 1:
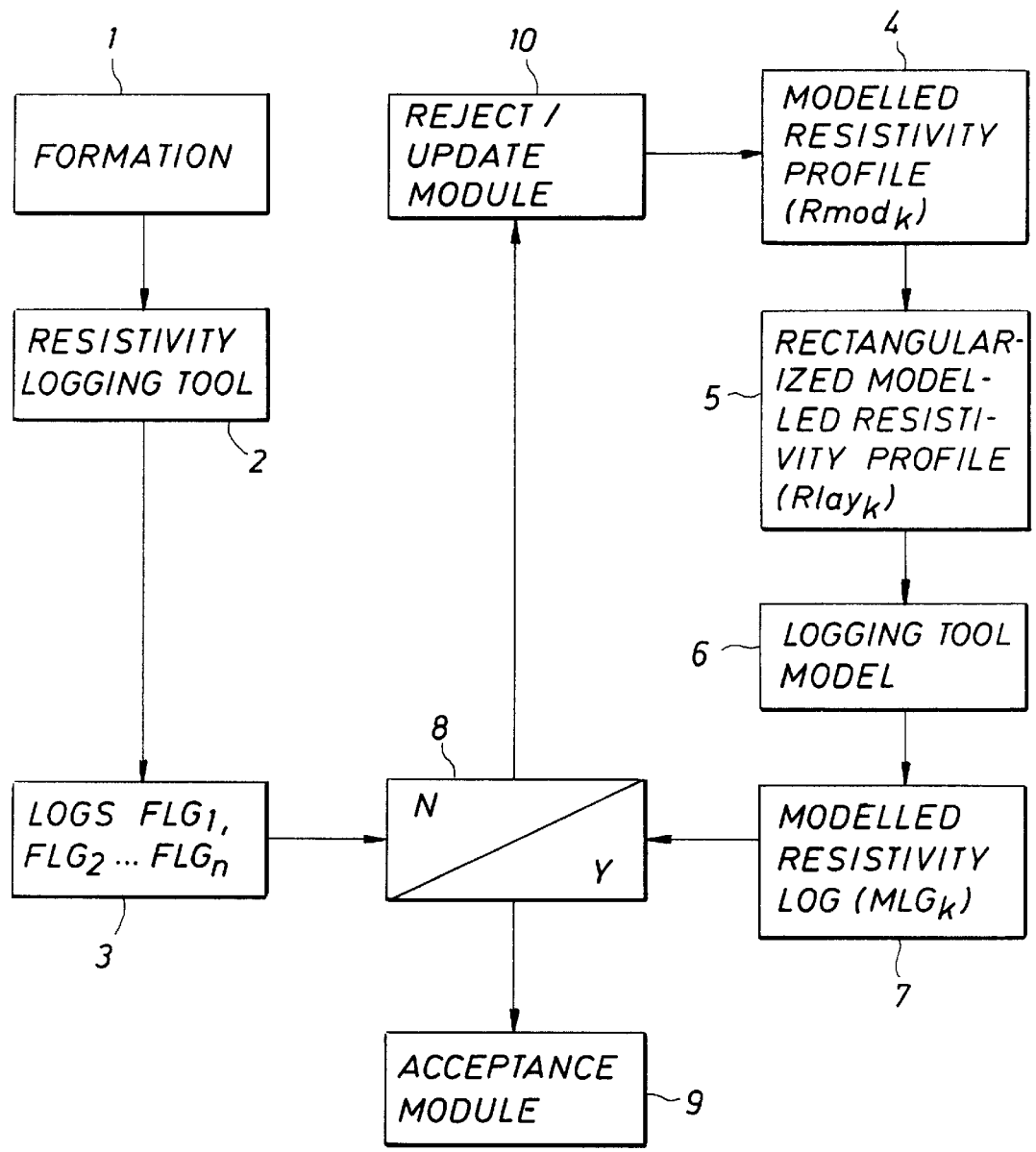
FIG. 1 shows a block diagram of an inversion scheme for iterated forward modeling of an earth formation resistivity profile.

In applying the invention the logging tool injects or induces electric currents in the formation and produces for each specific radial distance interval a resistivity log ($FLG_k$) which in fact depends on the resistivities in a region of various radial distance intervals. Therefore the resistivity log is determined as a weighted average of such region of various radial distance intervals, with relatively high weight factors for the specific radial distance interval. The resistivities in the various radial distance intervals are then determined simultaneously by inversion of the logging data, which is done by matching the modelled resistivity log ($MLG_k$) to the measured resistivity logs ($FLG_k$) the modelled resistivity profiles ($Rmod_k$) to the measured resistivity logs ($FLG_k$) by updating the modelled resistivity profiles ($Rmod_k$) in an iterative manner.

A particularly advantageous feature of the inversion method applied in the method of the invention is that in step d) updating (also termed boosting) of the modelled resistivity profile ($Rmod_k$) of a specific radial distance interval (k) is done by as a function of the ratio of the resistivity log ($FLG_k$) to the modelled resistivity log ($MLG_k$) pertaining to that radial distance interval. In this manner convergence of the inversion procedure is generally achieved in only a few iterations when compared to conventional inversion methods in which the parameters to be determined are perturbed in a trial and error approach. Suitably updating each modelled resistivity profile ($Rmod_k$) in step d) is done by multiplying each $Rmod_k$ with the ratio $FLG_k/MLG_k$.

To select the modelled resistivity profiles for the various radial distance intervals, it is preferred that step b) comprises selecting a profile of the fluid invaded zone in the formation surrounding the wellbore.

A further drawback of the method known from U.S. Pat. No. 5,446,654 is that the locations of the interfaces between the earth layers have to be selected correctly at the start of the iterative procedure because the interface positions do not change during the iteration process. This is because the rectangularized modelled resistivity profile is updated by multiplying each section of constant magnitude (i.e. each earth layer) by the ratio: centre-of-layer value of the real log/centre-of-layer value of the modelled log pertaining to that layer. In order to overcome this drawback it is a preferred feature of the method according to the invention to rectangularize each modelled resistivity profile ($Rmod_k$) before being supplied as input to the logging tool simulator and to update each rectangularized $Rmod_k$ at a plurality of points along each section of constant magnitude.

By multiplying the modelled resistivity profile ($Rmod_k$) with a multiplication factor at a plurality of points along each section of constant magnitude it is achieved that the updated $Rmod_k$ is allowed to assume any suitable shape other than rectangular because the multiplication factor can vary from point to point along each section of constant magnitude. The updated $Rmod_k$ is then rectangularized whereby the interface positions can change because the updated $Rmod_k$ is allowed to assume a different shape when compared to its shape in the previous cycle. This is in contrast to the prior art method in which updating of the rectangular profile is carried out on a layer-by-layer basis resulting in a new rectangular profile, however with the same interface positions.

Suitably the step of rectangularizing $Rmod_k$ comprises determining points of $Rmod_k$ at which a derivative thereof with respect to depth has a selected magnitude. Such points simulate the locations of the interfaces of the earth layers. For example, the derivative is the first derivative and the selected magnitude comprises at least one of a local maximum and a local minimum of the first derivative.

Reference is made to U.S. Pat. No. 5,210,691, the disclosure of which is incorporated herein by reference. This patent discloses a method of determining electric resistivity of an earth formation surrounding a wellbore filled with a wellbore fluid, the method comprising:

a) operating a resistivity logging tool in the wellbore so as to provide a plurality of resistivity logs of the earth formation for different radial distance intervals relative to the wellbore;
b) for each radial distance interval, selecting a modelled resistivity profile;
c) inputting the modelled resistivity profiles to a logging tool simulator so as to provide for each radial distance interval a modelled resistivity log having a depth of investigation corresponding to the radial distance interval;
d) for each radial distance interval updating the modelled resistivity profile in dependence of an observed deviation of the resistivity log from the modelled resistivity log; and
e) repeating steps c) and d) until for each radial distance interval the difference between the resistivity log and the corresponding modelled resistivity log is below a selected threshold value.

In the known method, a set of equations is solved to obtain for each iteration an intermediate quantity, subsequently the difference of the intermediate quantities of two successive iterations is calculated. The intermediate quantity is a function of the tool response which has to be calculated, and this can only suitably be done when the so-called Born approximation applies. The modelled resistivity profile is updated by multiplying the used modelled resistivity profile with an exponential function of the difference between the intermediate quantities of two successive iterations. Although this known method converges in a few iterations, the determination of the intermediate quantities involves solving a large number of equations, and this is still time consuming.

DESCRIPTION OF A PREFERRED EMBODIMENT

Reference is now made to FIG. 1 showing an inversion scheme for iterated forward modelling of a resistivity profile of an earth formation 1 provided with a wellbore (not shown) in which a resistivity logging tool 2 is arranged.

In applying the method of the invention the resistivity logging tool 2 is operated in the wellbore to provide resistivity logs ($FLG_1$, $FLG_2$, . . . , $FLG_n$) 3 of different radial distance intervals of the earth formation surrounding the wellbore. The wellbore is filled with a wellbore fluid which penetrates the surrounding earth formation to a certain radial distance. The radial distance intervals start at the wellbore wall and extend to a radius which exceeds the expected depth of penetration of the wellbore fluid by a suitable distance. The logging tool thereby provides a plurality of resistivity logs ($FLG_1$, $FLG_2$, . . . , $FLG_n$) 3, one for each radial distance interval k. The resistivities in the various radial distance intervals k are then determined simultaneously by inversion of the logging data, which is done by matching the modelled resistivity log ($MLG_k$) to the measured resistivity logs ($FLG_k$) the modelled resistivity profiles ($Rmod_k$) to the measured resistivity logs ($FLG_k$) by updating the modelled resistivity profiles ($Rmod_k$) in an iterative manner.

The iteration starts with initializing the model. The thickness of the fluid invaded zone is estimated, and each modelled resistivity profile ($Rmod_k$) 4 is initialized whereby the estimated thickness of the invaded zone is taken into account. Suitably the measured resistivity logs ($FLG_k$) are used as a first approximation.

For each radial distance interval (k, k=1 . . . n) and the corresponding resistivity log ($FLG_k$) the inversion scheme of FIG. 1 is applied as follows. The modelled resistivity profile ($Rmod_k$) 4 is rectangularized to provide a rectangularized modelled resistivity profile ($Rlay_k$) 5 (the procedure for rectangularizing $Rmod_k$ 4 is explained hereinafter).

With the aid of a logging tool simulator in the form of logging tool model 6 the modelled resistivity log ($MLG_k$) 7 is then computed by running the logging tool model 6 with the rectangularized modelled resistivity profile ($Rlay_k$) 5 as input, where k=1 . . . n. The modelled resistivity log ($MLG_k$) 7 is then compared with the measured resistivity log ($FLG_k$) 3, and a selected threshold value or criterion 8 for matching of the modelled resistivity log ($MLG_k$) 7 to the measured resistivity log ($FLG_k$) 3 is applied. If the difference between the modelled resistivity log ($MLG_k$) 7 and the measured resistivity log ($FLG_k$) 3 matches the criterion 8, the rectangularized modelled resistivity profile ($Rlay_k$) 5 is accepted by acceptance module 9. If, on the other hand, the difference between the modelled resistivity log ($MLG_k$) 7 and the measured resistivity log ($FLG_k$) 3 does not match the criterion 8 (is larger than the selected threshold value), the rectangularized modelled resistivity profile ($Rlay_k$) 5 is updated or boosted in reject/update module 10.

Updating the rectangularized modelled resistivity profile ($Rlay_k$) 5 is carried out by modifying the rectangularized modelled resistivity profile ($Rlay_k$) 5 in dependence on the observed difference between the modelled resistivity log ($MLG_k$) 7 and the measured resistivity log ($FLG_k$) 3, by multiplying the rectangularized modelled resistivity profile ($Rlay_k$) 5 with the ratio $FLG_k/MLG_k$ at a plurality of points along each section of constant magnitude of the rectangularized modelled resistivity profile ($Rlay_k$) 5. In this manner an updated modelled resistivity profile ($Rmod'_k$) 4a (shown in FIG. 2) is obtained, which is subsequently rectangularized to provide a new rectangularized modelled resistivity profile (Rlay'$_k$) which is then used in a next (similar) iteration cycle.

Referring to FIG. 2, the procedure for rectangularizing of a modelled resistivity profile (Rmod$_k$) 4 is as follows. The points of modelled resistivity profile (Rmod$_k$) 4 at which the first derivative with respect to depth along the wellbore assumes a local maximum or a local minimum are taken to be the momentary locations of the interfaces between the earth layers, and which are the points of step-wise change of the rectangularized modelled resistivity profile (Rlay$_k$) 5. In-between each pair of adjacent points the rectangularized modelled resistivity profile (Rlay$_k$) 5 has a constant magnitude. After obtaining the modelled resistivity log (MLG$_k$) 7 by running the logging tool model with the rectangularized modelled resistivity profile (Rlay$_k$) 5 as formation input, the ratio of FLG$_k$ 3 to MLG$_k$ 7 is determined. The rectangularized modelled resistivity profile (Rlay$_k$) 5 is then updated if necessary according to the match criterion 8, by multiplying Rlay$_k$ 5 with the ratio FLG$_k$/MLG$_k$. This multiplication is carried out for a plurality of points along each section of constant magnitude to provide the updated rectangularized modelled resistivity profile (Rmod'$_k$) 4a which is then rectangularized in the same way as described above to provide the new rectangularized modelled resistivity profile (Rlay'$_k$) (not shown). It will be clear that the points of step-wise change of the new Rlay' do not necessarily coincide with the points of step-wise change of the previous Rlay.

It is therefore achieved that the applied method allows changing of the bed boundaries during the inversion procedure, and thereby to provide improved results when compared to the prior art.

We claim:

1. A method of determining electric resistivity of an earth formation surrounding a wellbore filled with a wellbore fluid, the method comprising:
   a) operating a resistivity logging tool in the wellbore so as to provide a plurality of resistivity logs of the earth formation for different radial distance intervals relative to the wellbore;
   b) for each radial distance interval, selecting a modelled resistivity profile;
   c) inputting the modelled resistivity profiles to a logging tool simulator so as to provide for each radial distance interval a modelled resistivity log having a depth of investigation corresponding to the radial distance interval;
   d) for each radial distance interval updating the modelled resistivity profile in dependence of an observed deviation of the resistivity log from the modelled resistivity log; and
   e) repeating steps c) and d) until for each radial distance interval the difference between the resistivity log and the corresponding modelled resistivity log is below a selected threshold value, characterized in that step d) comprises updating each modelled resistivity profile as a function of a ratio of the resistivity log to the modelled resistivity log pertaining to that radial distance interval.

2. The method of claim 1 wherein step b) comprises selecting a profile of the fluid invaded zone in the formation surrounding the wellbore.

3. The method of claim 1 wherein each modelled resistivity profile is multiplied by the ratio of the resistivity log to the modelled resistivity log for at least one interval.

4. The method of claim 1 wherein each modelled resistivity profile is rectangularized before being input to the logging tool simulator, and wherein each rectangularized modelled resistivity profile is updated at a plurality of points along each section of constant magnitude of the rectangularized modelled resistivity profile.

5. The method of claim 4 wherein the step of rectangularizing a modelled resistivity profile comprises determining points of modelled resistivity profile at which a derivative thereof with respect to depth has a selected magnitude.

6. The method of claim 5 wherein the derivative is the first derivative and the selected magnitude comprises at least one of a local maximum and a local minimum of the first derivative.

* * * * *